(12) United States Patent
Arashi et al.

(10) Patent No.: US 10,800,295 B2
(45) Date of Patent: Oct. 13, 2020

(54) SEAT FOR VEHICLE

(71) Applicant: TOYOTA BOSHOKU KABUSHIKI KAISHA, Aichi-ken (JP)

(72) Inventors: Masato Arashi, Aichi-ken (JP); Osamu Ikai, Aichi-ken (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 16/193,461

(22) Filed: Nov. 16, 2018

(65) Prior Publication Data

US 2019/0160978 A1 May 30, 2019

(30) Foreign Application Priority Data

Nov. 24, 2017 (JP) .................. 2017-226007

(51) Int. Cl.
| | |
|---|---|
| *B60N 2/22* | (2006.01) |
| *B60N 2/225* | (2006.01) |
| *B60N 2/20* | (2006.01) |
| *B60N 2/68* | (2006.01) |
| *A47C 1/024* | (2006.01) |

(52) U.S. Cl.
CPC ............ *B60N 2/20* (2013.01); *B60N 2/225* (2013.01); *B60N 2/68* (2013.01); *B60N 2/682* (2013.01); *A47C 1/024* (2013.01)

(58) Field of Classification Search
CPC . B60N 2/20; B60N 2/225; B60N 2/68; B60N 2/682
USPC ........................................................ 297/362
See application file for complete search history.

(56) References Cited

U.S. PATENT DOCUMENTS

| | | | | |
|---|---|---|---|---|
| 7,950,741 | B2 * | 5/2011 | Mitsuhashi ......... | B60N 2/2227 297/362 |
| 8,262,165 | B2 * | 9/2012 | Mitsuhashi ......... | B60N 2/2252 297/362 |
| 9,315,121 | B2 * | 4/2016 | Enokijima ............. | B60N 2/20 |
| 9,440,561 | B2 * | 9/2016 | Tsuji .................... | B60N 2/2252 |

(Continued)

FOREIGN PATENT DOCUMENTS

| | | | | |
|---|---|---|---|---|
| JP | 2003146121 A | * | 5/2003 | ............ B60N 2/682 |
| JP | 2003289973 A | * | 10/2003 | ............ B60N 2/682 |

(Continued)

*Primary Examiner* — Rodney B White
(74) *Attorney, Agent, or Firm* — Greenblum & Bernstein, P.L.C.

(57) ABSTRACT

A seat for a vehicle includes: a recliner configured to allow a back frame to pivot about a prescribed pivot axis with respect to a cushion frame. The seat frame is provided with a through hole arranged around the pivot axis. The recliner has a protruding portion fitted into the through hole. The seat further includes a joint portion formed by joining the seat frame and the recliner using laser welding. The joint portion has an outer circumferential portion, an inner circumferential portion and a circumferential end portion. The outer circumferential portion extends along an edge on an outer circumferential side of the through hole. The inner circumferential portion extends along an edge on an inner circumferential side of the through hole. The circumferential end portion extends along an edge on an end side of the through hole and connects the outer circumferential portion and the inner circumferential portion.

4 Claims, 7 Drawing Sheets

(56) References Cited

U.S. PATENT DOCUMENTS

2011/0193391 A1* 8/2011 Mitsuhashi .......... B60N 2/2252
297/354.1

FOREIGN PATENT DOCUMENTS

| JP | 2011195076 A | * 10/2011 | ............. B60N 2/682 |
| JP | 2017-30496 | 2/2017 | |

* cited by examiner

SEAT FOR VEHICLE

This nonprovisional application is based on Japanese Patent Application No. 2017-226007 filed on Nov. 24, 2017 with the Japan Patent Office, the entire contents of which are hereby incorporated by reference.

BACKGROUND

Field

The present disclosure relates to a seat for a vehicle.

Description of the Background Art

A seat for a vehicle disclosed in Japanese Patent Laying-Open No. 2017-30496 includes a seat frame having a back frame and a cushion frame, and a recliner configured to adjust a backrest angle of the back frame. Right and left side frames of the back frame are coupled via the recliner to reclining plates disposed at right-sided and left-sided rear ends of the cushion frame.

SUMMARY

As disclosed in Japanese Patent Laying-Open No. 2017-30496 above, a seat for a vehicle including a recliner is known. In such a seat for a vehicle, the vehicle may in some cases be subjected to an external shock, such as when the vehicle receives collision from the front or from the back. In this case, an excessive moment is input to the recliner about a pivot axis. Therefore, it is necessary to sufficiently increase the strength of joining between the seat frame and the recliner.

When arc welding is used to join the seat frame and the recliner, broadening a region of arc welding results in an increase in volume of a bead. In this case, the seat for the vehicle increases in weight, although the strength of joining between the seat frame and the recliner increases.

Accordingly, an object of the present disclosure is to solve the above-described problem and provide a seat for a vehicle allowing for a sufficient increase in resistance of joining between a seat frame and a recliner to an external shock, while suppressing an increase in seat weight.

A seat for a vehicle according to the present disclosure includes: a seat frame having a back frame and a cushion frame; and a recliner configured to allow the back frame to pivot about a prescribed pivot axis with respect to the cushion frame. One of the seat frame and the recliner is provided with a through hole arranged around the pivot axis. The other of the seat frame and the recliner has a protruding portion protruding in an axial direction of the pivot axis and fitted into the through hole. The seat for a vehicle further includes a joint portion formed by joining the seat frame and the recliner using laser welding. The joint portion has an outer circumferential portion, an inner circumferential portion and a circumferential end portion. The outer circumferential portion extends along an edge on an outer circumferential side of the through hole when viewed from the pivot axis. The inner circumferential portion extends along an edge on an inner circumferential side of the through hole when viewed from the pivot axis. The circumferential end portion extends along an edge on an end side of the through hole in a circumferential direction of the pivot axis and connects the outer circumferential portion and the inner circumferential portion.

DESCRIPTION OF THE PREFERRED EMBODIMENTS

An embodiment of the present disclosure will be described with reference to the drawings. In the drawings referenced below, the same or corresponding members are denoted by the same reference numerals.

Figure 1:
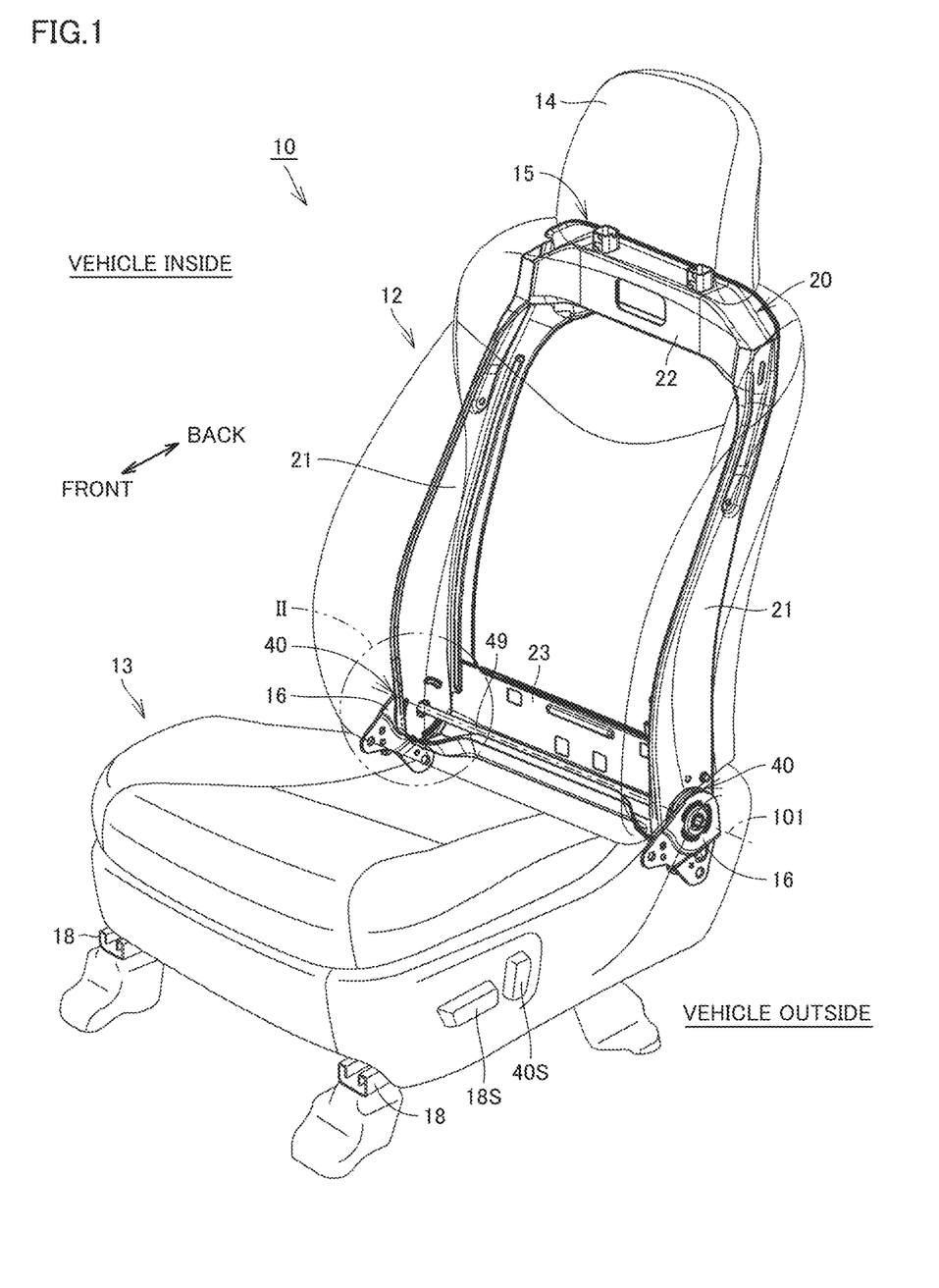
FIG. 1 is a perspective view showing a seat for a vehicle according to an embodiment of the present disclosure.

FIG. 1 is a perspective view showing a seat for a vehicle according to an embodiment of the present disclosure. Referring to FIG. 1, a seat 10 for a vehicle according to the present embodiment is a seat mounted on an automobile. FIG. 1 representatively shows a seat configured as a left-sided seat of an automobile. The seat right side of seat 10 for a vehicle corresponds to the vehicle inside, and the seat left side of seat 10 for a vehicle corresponds to the vehicle outside.

First, an overall configuration of seat 10 for a vehicle will be described. Seat 10 for a vehicle includes a seat cushion 13, a pair of right and left slide rails 18, a seat back 12, a headrest 14, and a pair of right and left recliners 40.

Seat cushion 13 is a seat portion that supports an occupant from below. Seat cushion 13 is provided on a floor in a vehicle compartment, with slide rails 18 being interposed. A position of seat cushion 13 in a seat front-back direction can be adjusted by slide rails 18. Slide rails 18 are of the electrically operated type, and allow seat cushion 13 to slide by an operation of pushing and pulling in the front-back direction a switch 18S provided on a side portion of seat cushion 13.

Seat back 12 is a seat portion that supports the occupant's back, and forms a backrest. Headrest 14 forms a headrest above seat back 12. An inclination (backrest angle) of seat back 12 can be adjusted by recliners 40. Recliners 40 are of the electrically operated type, and allow seat back 12 to be inclined by an operation of pushing and inclining in the front-back direction a switch 40S provided on the side portion of seat cushion 13.

Slide rails 18 and recliners 40 are not limited to the above-described electrically operated type, and may be of the manual type.

Next, a frame configuration of seat 10 for a vehicle will be described. Seat 10 for a vehicle has a seat frame 15 forming a framework of the seat. Seat frame 15 includes a back frame 20, and a cushion frame having a pair of right and left reclining plates 16.

Back frame 20 forms a framework of the seat in seat back 12. Back frame 20 as a whole has a rectangular frame shape. Back frame 20 has a pair of right and left side frames 21, an upper frame 22, and a lower panel 23.

The pair of side frames 21 are spaced apart from each other in a seat width direction. Side frames 21 extend vertically. Side frames 21 are made of steel material. Side frames 21 are arranged such that the seat width direction corresponds to a thickness direction, and are made of steel material whose opposing ends in the seat front-back direction are folded toward the seat inside.

Upper frame 22 is provided on the upper end side of side frames 21. Upper frame 22 extends in the seat width direction and connects the pair of side frames 21. Lower panel 23 is provided on the lower end side of side frames 21. Lower panel 23 extends in the seat width direction and connects the pair of side frames 21.

Back frame 20 is connected to recliners 40. The lower ends of side frames 21 are connected to recliners 40. Recliners 40 allow back frame 20 to pivot about a central axis 101 with respect to the cushion frame. Central axis 101 is a pivot axis of recliners 40 and extends in the seat width direction.

The cushion frame forms a framework of the seat in seat cushion 13. Reclining plates 16 are provided at rear ends of the cushion frame. Reclining plates 16 are connected to recliners 40. Reclining plates 16 are made of steel material. Reclining plates 16 are made of steel material arranged such that the seat width direction corresponds to the thickness direction.

Figure 2:
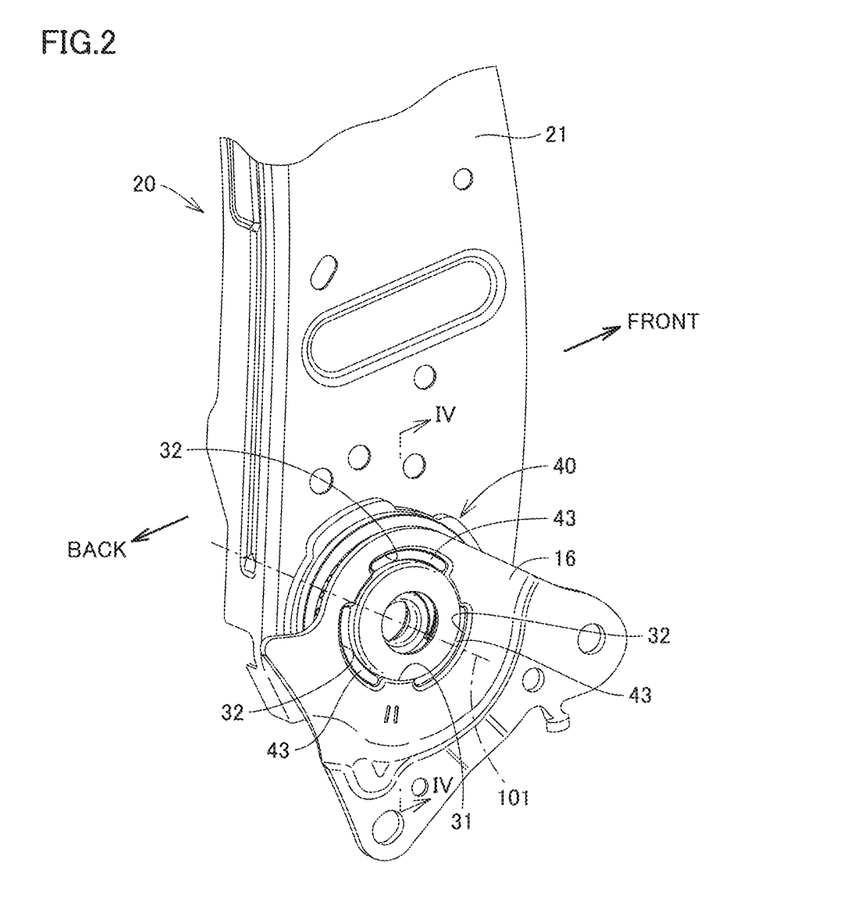
FIG. 2 is a perspective view of a region enclosed by a two-dot chain line II in FIG. 1, when viewed from the vehicle inside.
Figure 3:
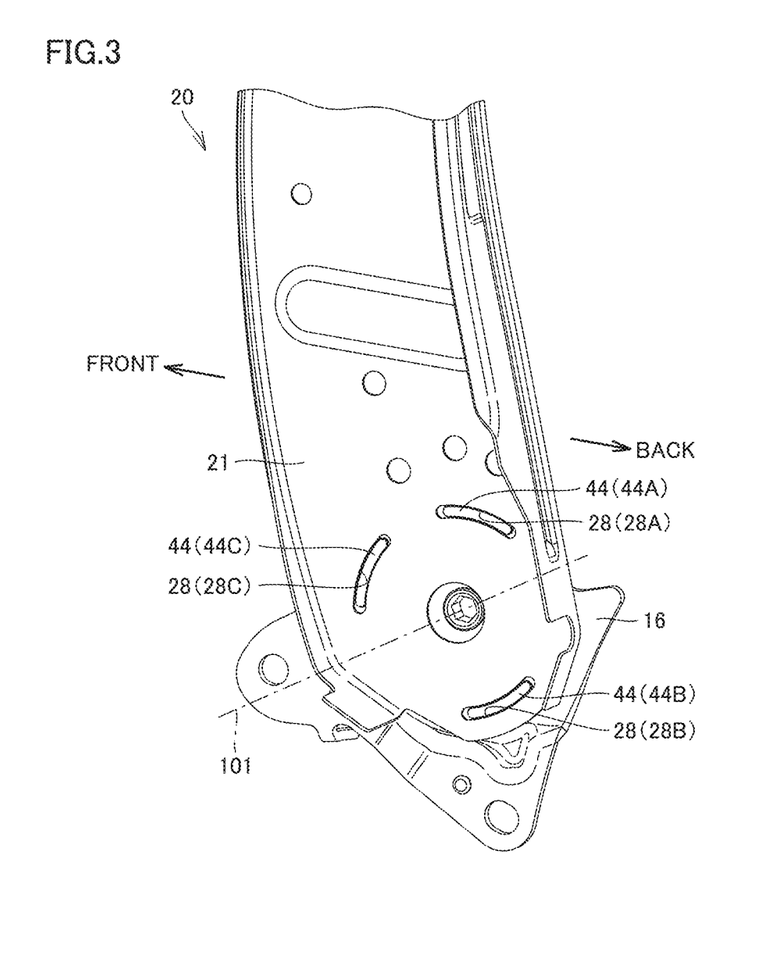
FIG. 3 is a perspective view of the region enclosed by the two-dot chain line II in FIG. 1, when viewed from the vehicle outside.
Figure 4:
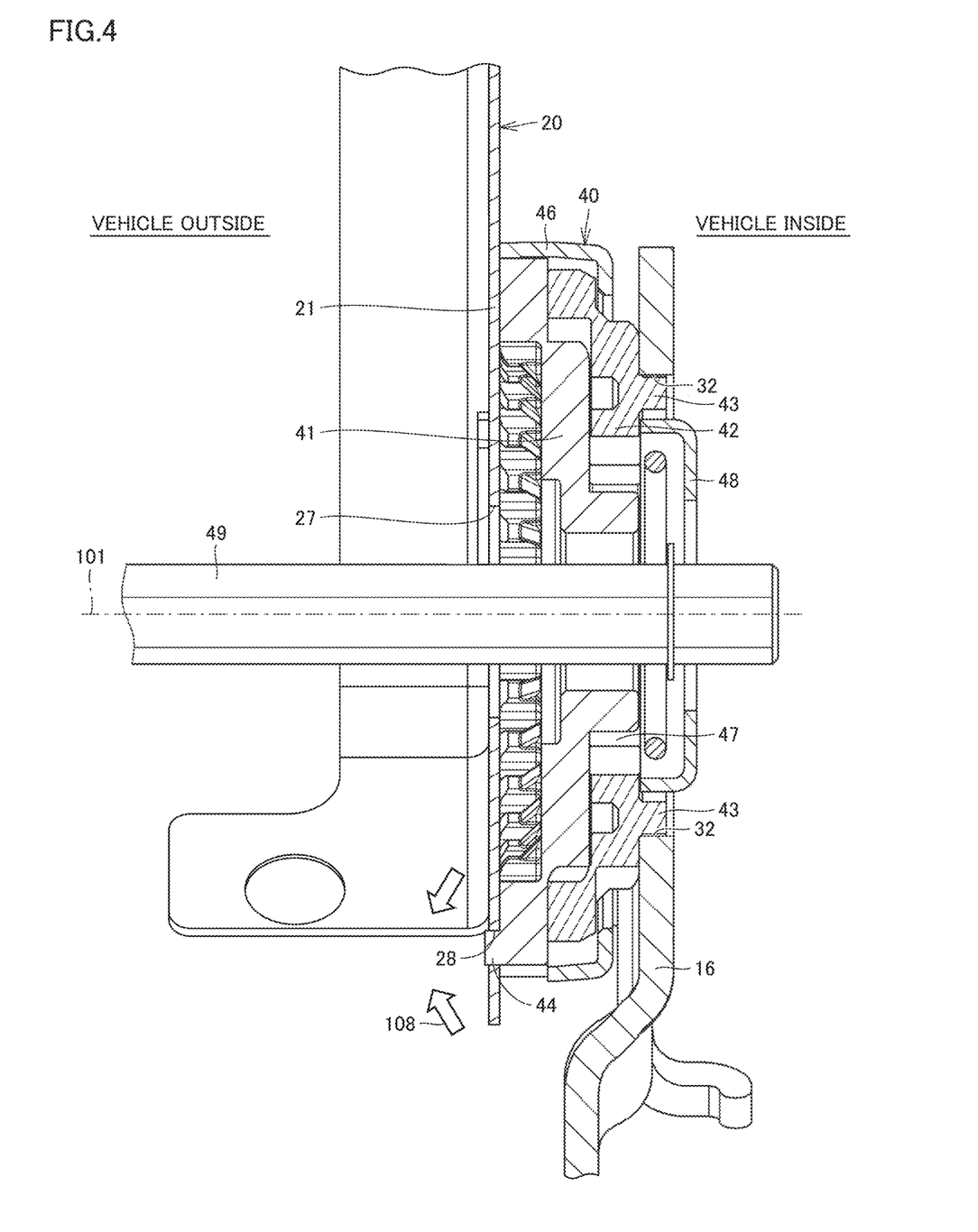
FIG. 4 is a cross-sectional view showing a recliner when viewed from a direction of an arrow on a line IV-IV in FIG. 2.
Figure 5:
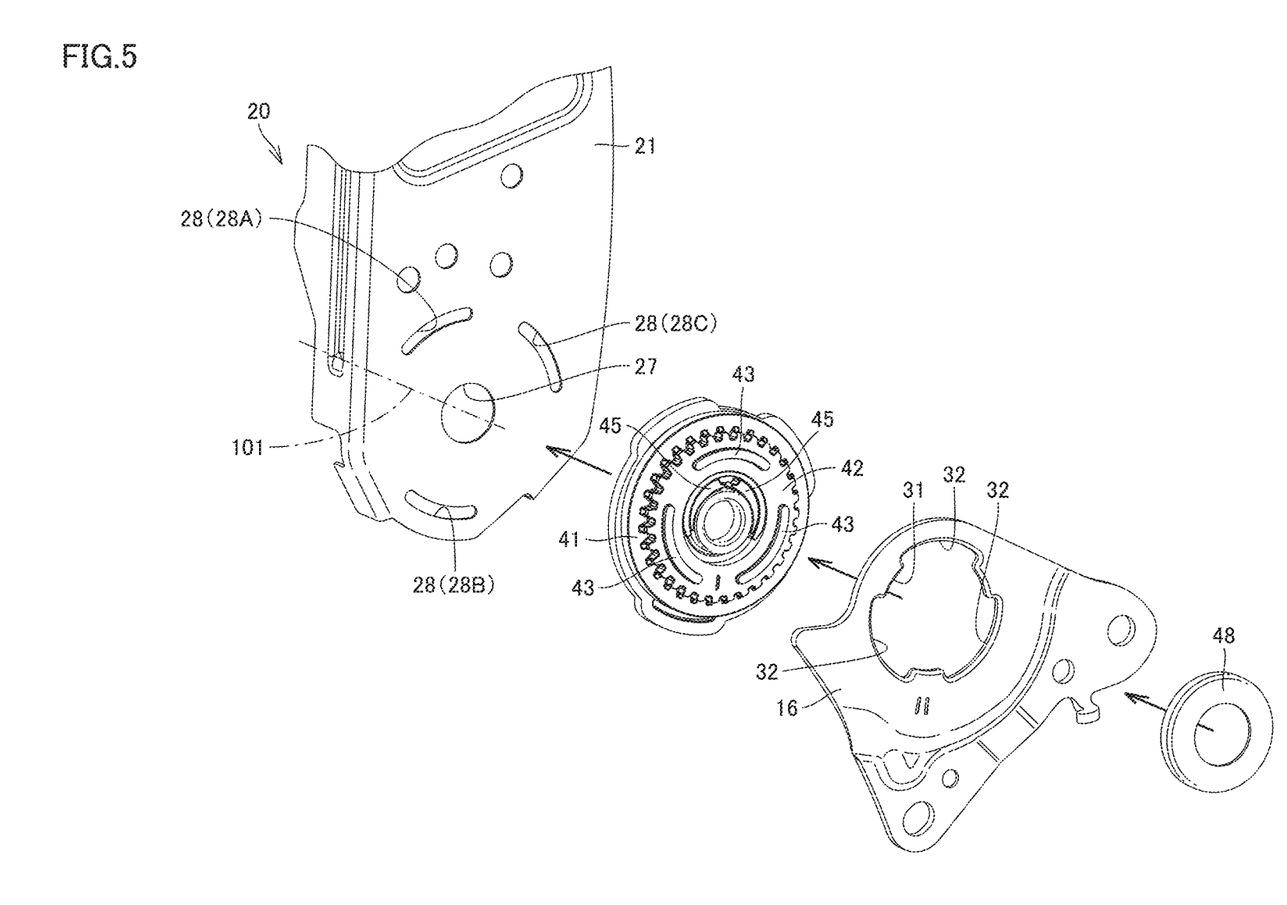
FIG. 5 is an exploded view showing the recliner in FIG. 2.
Figure 6:
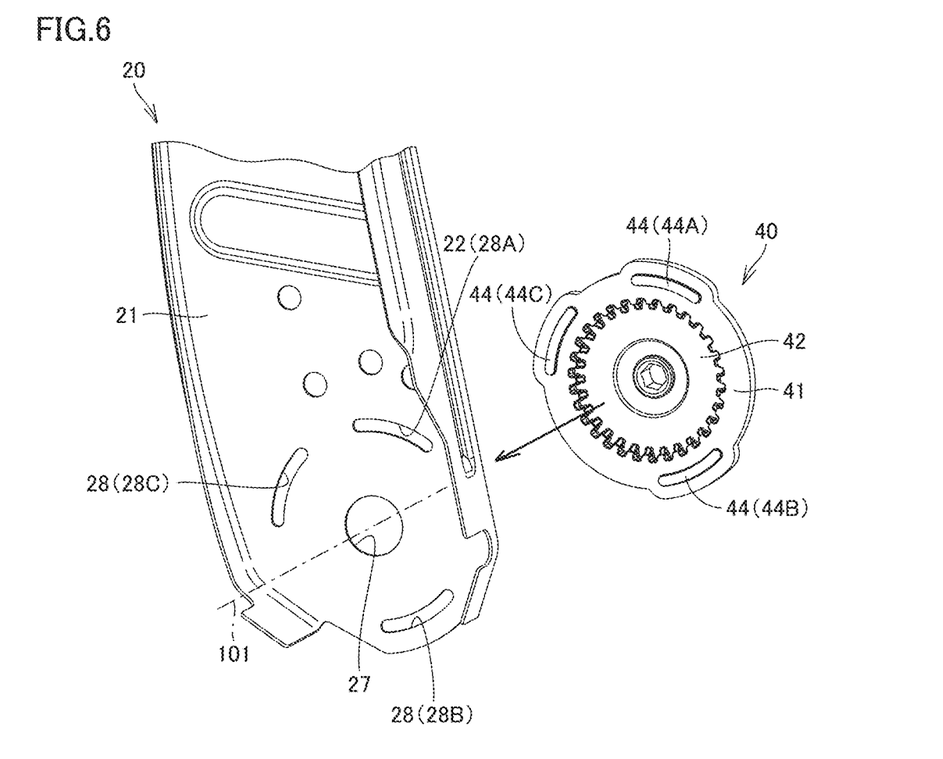
FIG. 6 is an exploded view (partial) showing the recliner in FIG. 3.

FIG. 2 is a perspective view of a region enclosed by a two-dot chain line II in FIG. 1, when viewed from the vehicle inside. FIG. 3 is a perspective view of the region enclosed by the two-dot chain line II in FIG. 1, when viewed from the vehicle outside. FIG. 4 is a cross-sectional view showing the recliner when viewed from a direction of an arrow on a line IV-IV in FIG. 2. FIG. 5 is an exploded view showing the recliner in FIG. 2. FIG. 6 is an exploded view (partial) showing the recliner in FIG. 3.

Next, a structure of recliner 40 will be simply described. Since the pair of right and left recliners 40 have a symmetrical structure, a structure of recliner 40 provided on the vehicle inside will be representatively described below.

Referring to FIGS. 1 to 6, recliner 40 is inserted between back frame 20 (side frame 21) and reclining plate 16 in the seat width direction. Recliner 40 couples back frame 20 to reclining plate 16 so as to allow back frame 20 to pivot about central axis 101 with respect to reclining plate 16.

As shown in FIG. 5, recliner 40 includes an internal gear member 41, an external gear member 42, an outer circumferential ring 46 (see FIG. 4), a pair of wedge members 45, an operation member having an operation portion 47, a cap 48, and a connecting rod 49.

Internal gear member 41 is provided with an internal gear formed of a plurality of gear teeth protruding radially inward and aligned circumferentially. Internal gear member 41 is joined to back frame 20 (side frame 21). External gear member 42 is provided with an external gear formed of a plurality of gear teeth protruding radially outward and aligned circumferentially. External gear member 42 is combined with internal gear member 41 in an axial direction of central axis 101. The internal gear of internal gear member 41 is arranged on an outer circumference of the external gear of external gear member 42. External gear member 42 is joined to reclining plate 16.

Outer circumferential ring 46 has a shape of a ring and is assembled onto the outer circumference of internal gear member 41 and external gear member 42 from the vehicle inside. Outer circumferential ring 46 keeps internal gear member 41 and external gear member 42 in a combined state.

The pair of wedge members 45 have a symmetrically curved shape. The pair of wedge members 45 are inserted into a gap radially provided between internal gear member 41 and external gear member 42. Operation portion 47 is arranged in a space circumferentially provided between the pair of wedge members 45 in the gap provided between internal gear member 41 and external gear member 42.

Cap 48 is assembled onto external gear member 42 from the vehicle inside. Cap 48 prevents wedge members 45 from falling. Connecting rod 49 extends along central axis 101. Opposing ends of connecting rod 49 are coupled to the above-described operation member in the pair of right and left recliners 40.

The internal gear of internal gear member 41 and the external gear of external gear member 42 are constantly pressed against each other in the radial direction by wedge members 45. As a result, the internal gear of internal gear member 41 and the external gear of external gear member 42 are kept in a deeply engaged state without backlash and are in a rotation stopped state. Rotation from a driving motor (not shown) is transmitted to the operation member through connecting rod 49. When the operation member rotates, wedge members 45 are pushed and rotated in the circumferential direction by operation portion 47. As a result, the internal gear of internal gear member 41 and the external gear of external gear member 42 can rotate relatively, while changing the engagement position of the internal gear of internal gear member 41 and the external gear of external gear member 42.

Next, a joining structure of seat frame 15 and recliner 40 will be described in detail.

Referring to FIGS. 2, 4 and 5, a through hole 31 is formed in reclining plate 16. Through hole 31 penetrates through reclining plate 16 in the seat width direction. Through hole 31 has a plurality of enlarged diameter portions 32. The plurality of enlarged diameter portions 32 are spaced apart from one another in the circumferential direction of central axis 101. The plurality of enlarged diameter portions 32 are arranged at equal intervals in the circumferential direction of central axis 101. Through hole 31 has a circular opening shape with the diameter being enlarged locally in each enlarged diameter portion 32.

External gear member 42 has a plurality of protruding portions 43. The plurality of protruding portions 43 are provided at the positions corresponding to the plurality of enlarged diameter portions 32. Protruding portions 43 protrude in the axial direction of central axis 101.

The plurality of protruding portions 43 are fitted into the plurality of enlarged diameter portions 32, respectively. A laser beam is applied along an edge on the outer circumferential side of through hole 31 to thereby join external gear member 42 to reclining plate 16.

Figure 7:
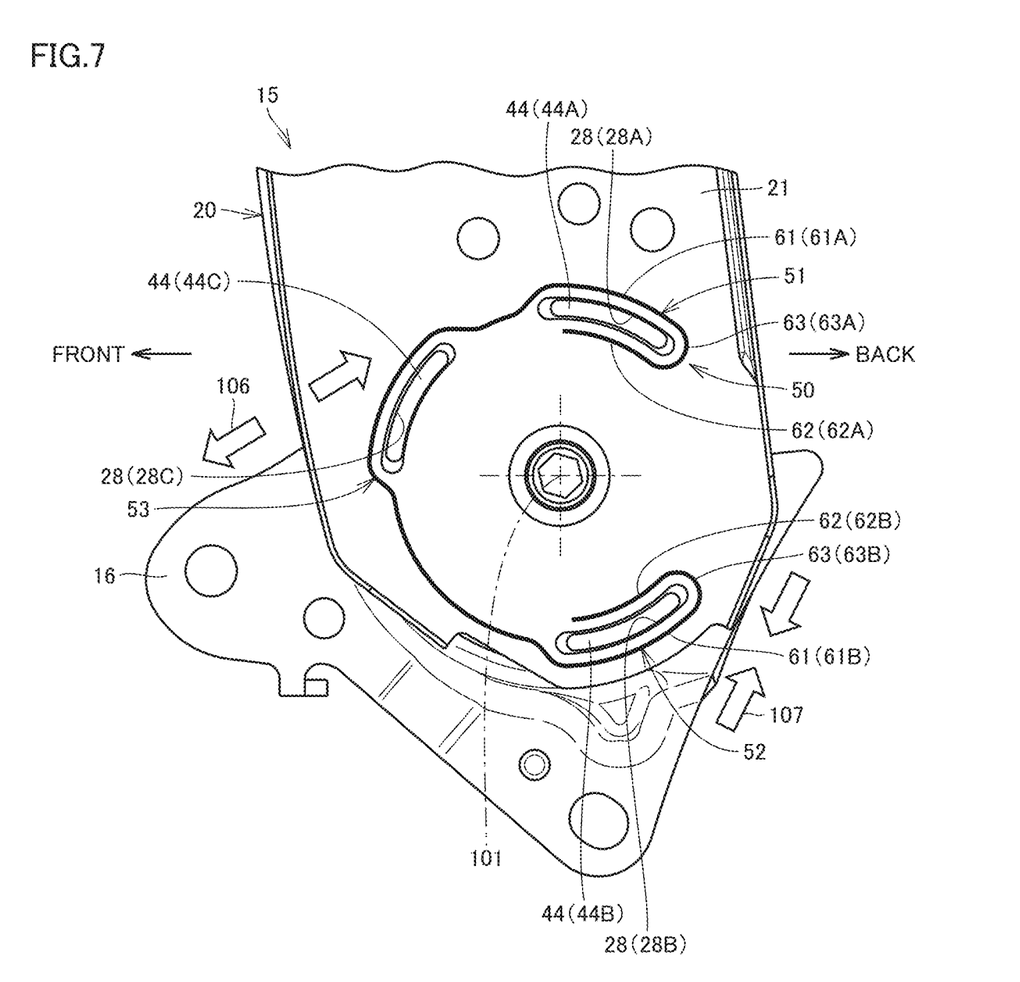
FIG. 7 is a side view of the region enclosed by the two-dot chain line II in FIG. 1, when viewed from the vehicle outside.
Figure 8:
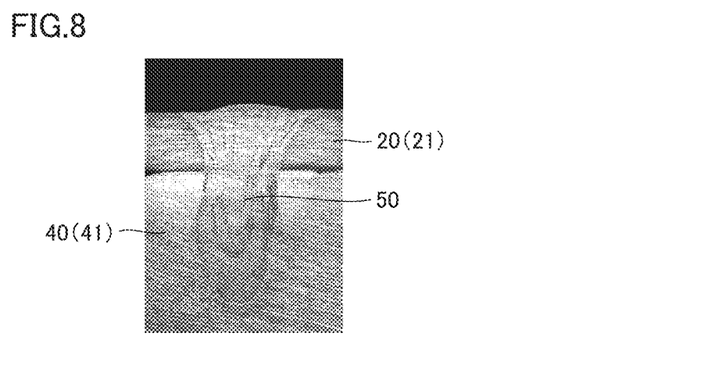
FIG. 8 is a photograph showing a cross section of a joint portion between a back frame and the recliner in FIG. 7.

FIG. 7 is a side view of the region enclosed by the two-dot chain line II in FIG. 1, when viewed from the vehicle outside. FIG. 8 is a photograph showing a cross section of a joint portion between the back frame and the recliner in FIG. 7.

Referring to FIG. 4 and FIGS. 6 to 8, a through hole 27 and through holes 28 are formed in back frame 20 (side frame 21). Through hole 27 and through holes 28 penetrate through back frame 20 (side frame 21) in the seat width direction.

Through hole 27 is provided on central axis 101. Through hole 27 has a circular opening shape. Connecting rod 49 is inserted into through hole 27. Through holes 28 are arranged around central axis 101. Each of through holes 28 has an opening shape having a certain width in the radial direction of central axis 101 and extending in an arc shape around central axis 101.

As a plurality of through holes 28, a first through hole 28A, a second through hole 28B and a third through hole 28C are formed in back frame 20 (side frame 21). The plurality of through holes 28 are spaced apart from one another in the circumferential direction of central axis 101. The plurality of through holes 28 are arranged at unequal intervals in the circumferential direction of central axis 101.

Third through hole 28C is located between first through hole 28A and second through hole 28B in the circumferential direction of central axis 101. First through hole 28A and second through hole 28B are located more seat rearward than third through hole 28C. First through hole 28A and third through hole 28C are located above central axis 101. Second through hole 28B is located below central axis 101.

The shape of the through hole in the present disclosure is not limited to the above-described arc shape, and may be an arc shape having a curvature different from that of the arc around central axis 101, or may be a shape extending linearly around central axis 101, for example.

Internal gear member 41 has protruding portions 44. Protruding portions 44 protrude in the axial direction of central axis 101. Each of protruding portions 44 has a shape corresponding to the opening of through hole 28 when viewed from the axial direction of central axis 101, i.e., a convex shape having a certain width in the radial direction of central axis 101 and extending in an arc shape around central axis 101. Protruding portions 44 are fitted into through holes 28, respectively.

As a plurality of protruding portions 44, internal gear member 41 has a first protruding portion 44A, a second protruding portion 44B and a third protruding portion 44C. The plurality of protruding portions 44 are spaced apart from one another in the circumferential direction of central axis 101. First protruding portion 44A, second protruding portion 44B and third protruding portion 44C are provided at the positions corresponding to first through hole 28A, second through hole 28B and third through hole 28C, respectively. First protruding portion 44A, second protruding portion 44B and third protruding portion 44C are fitted into first through hole 28A, second through hole 28B and third through hole 28C, respectively.

The protruding portions may be provided on back frame 20 (side frame 21) and the through holes into which the protruding portions are fitted may be formed in recliner 40 (internal gear member 41).

As shown in FIG. 7, seat 10 for a vehicle has a joint portion 50. Joint portion 50 is formed by joining back frame 20 and recliner 40 using laser welding. Joint portion 50 is formed by joining side frame 21 and internal gear member 41 using laser welding. Joint portion 50 is an integrated portion formed as a result of melting and then coagulation of side frame 21 and internal gear member 41. Joint portion 50 generally has a cross-sectional shape tapered toward a direction of application of a laser beam.

Joint portion 50 has an outer circumferential portion 61, an inner circumferential portion 62 and a circumferential end portion 63. Outer circumferential portion 61 extends along an edge on the outer circumferential side of through hole 28 when viewed from central axis 101. Inner circumferential portion 62 extends along an edge on the inner circumferential side of through hole 28 when viewed from central axis 101. Circumferential end portion 63 extends along an edge on the end side of through hole 28 in the circumferential direction of central axis 101. Circumferential end portion 63 connects outer circumferential portion 61 and inner circumferential portion 62.

On the outer side in the radial direction of central axis 101 relative to through hole 28, outer circumferential portion 61 extends in an arc shape around central axis 101. On the inner side in the radial direction of central axis 101 relative to through hole 28, inner circumferential portion 62 extends in an arc shape around central axis 101. Circumferential end portion 63 extends to be curved between outer circumferential portion 61 and inner circumferential portion 62. Circumferential end portion 63 extends in a semi-arc shape between outer circumferential portion 61 and inner circumferential portion 62.

Joint portion 50 is formed by a laser beam for laser welding scanned from the outer circumferential side of through hole 28 through the end of through hole 28 in the circumferential direction to the inner circumferential side of through hole 28. Joint portion 50 extends along the edge of through hole 28 while keeping a certain spacing from the edge of through hole 28.

It is assumed that an automobile having seat 10 for a vehicle mounted thereon may in some cases be subjected to an external shock. For example, when the automobile receives collision from the back, an excessive moment is input to recliner 40 about central axis 101. At this time, a tensile load (load indicated by a white arrow 106 in FIG. 7) acts on the seat frontward side relative to central axis 101, and a compression load (load indicated by a white arrow 107 in FIG. 7) acts on the seat rearward side relative to central axis 101. Due to the above-described compression load, the seat rearward side of recliner 40 tends to be deformed so as to bend toward the vehicle inside (deformation indicated by a white arrow 108 in FIG. 4), and as a result, welding separation may occur in the joint portion between recliner 40 (internal gear member 41) and back frame 20 (side frame 21).

In order to deal with this, in the present embodiment, joint portion 50 is configured to have outer circumferential portion 61, inner circumferential portion 62 and circumferential end portion 63. With such a configuration, circumferential end portion 63 connecting outer circumferential portion 61 and inner circumferential portion 62 can extensively receive the excessive moment input to recliner 40. As a result, the occurrence of stress concentration on joint portion 50 can be avoided and the resistance of joining between back frame 20 and recliner 40 to the external shock can be increased.

Particularly, in the present embodiment, circumferential end portion 63 extends to be curved between outer circumferential portion 61 and inner circumferential portion 62. Therefore, when an excessive moment is input to recliner 40 about central axis 101, the occurrence of stress concentration on joint portion 50 can be prevented more effectively.

In addition, when arc welding is used to join back frame 20 and recliner 40, broadening a region of arc welding results in an increase in volume of a bead, which may lead to an increase in seat weight. In order to deal with this, in the present embodiment, laser welding is used to join back frame 20 and recliner 40 by joint portion 50. Therefore, in spite of the configuration in which joint portion 50 has outer circumferential portion 61, inner circumferential portion 62 and circumferential end portion 63, an increase in seat weight can be suppressed.

In the present embodiment, description has been given of the configuration in which joint portion 50 extends along the edge of through hole 28 while keeping a certain spacing from the edge of through hole 28. However, the present disclosure is not limited to such a configuration. In the present disclosure, the joint portion may extend along the edge of the through hole while changing a spacing between the joint portion and the edge of the through hole. For example, the joint portion may extend along the edge of the arc-shaped through hole in a corrugated manner. When there is almost no gap between a sidewall of the protruding portion and the edge of the through hole, the joint portion can also be provided at a boundary between the sidewall of the protruding portion and the edge of the through hole.

Joint portion 50 has a first welding line 51, a second welding line 52 and an intermediate welding line 53. First welding line 51 extends along an edge of first through hole 28A. Second welding line 52 extends along an edge of second through hole 28B. Intermediate welding line 53 connects first welding line 51 and second welding line 52.

First welding line 51 has a first outer circumferential portion 61A as outer circumferential portion 61, a first inner circumferential portion 62A as inner circumferential portion 62, and a first circumferential end portion 63A as circumferential end portion 63. That is, first outer circumferential portion 61A extends along an edge on the outer circumferential side of first through hole 28A when viewed from central axis 101. First inner circumferential portion 62A extends along an edge on the inner circumferential side of first through hole 28A when viewed from central axis 101. First circumferential end portion 63A extends along an edge on the end side of first through hole 28A in the circumferential direction of central axis 101. First circumferential end portion 63A connects first outer circumferential portion 61A and first inner circumferential portion 62A.

First circumferential end portion 63A is provided on the end side of first through hole 28A opposite to intermediate welding line 53 in the circumferential direction of central axis 101. Intermediate welding line 53 is provided on the end side of first through hole 28A in a counterclockwise direction around central axis 101, and first circumferential end portion 63A is provided on the end side of first through hole 28A in a clockwise direction around central axis 101.

Second welding line 52 has a second outer circumferential portion 61B as outer circumferential portion 61, a second inner circumferential portion 62B as inner circumferential portion 62, and a second circumferential end portion 63B as circumferential end portion 63. That is, second outer circumferential portion 61B extends along an edge on the outer circumferential side of second through hole 28B when viewed from central axis 101. Second inner circumferential portion 62B extends along an edge on the inner circumferential side of second through hole 28B when viewed from central axis 101. Second circumferential end portion 63B extends along an edge on the end side of second through hole 28B in the circumferential direction of central axis 101. Second circumferential end portion 63B connects second outer circumferential portion 61B and second inner circumferential portion 62B.

Second circumferential end portion 63B is provided on the end side of second through hole 28B opposite to intermediate welding line 53 in the circumferential direction of central axis 101. Intermediate welding line 53 is provided on the end side of second through hole 28B in the clockwise direction around central axis 101, and second circumferential end portion 63B is provided on the end side of second through hole 28B in the counterclockwise direction around central axis 101.

Intermediate welding line 53 extends along an edge of third through hole 28C on a path between first welding line 51 and second welding line 52. Intermediate welding line 53 extends along an edge on the outer circumferential side of third through hole 28C when viewed from central axis 101. Intermediate welding line 53 connects first outer circumferential portion 61A of first welding line 51 and second outer circumferential portion 61B of second welding line 52. First circumferential end portion 63A of first welding line 51 and second circumferential end portion 63B of second welding line 52 face each other in the circumferential direction of central axis 101.

First welding line 51, intermediate welding line 53 and second welding line 52 continuously extend in a manner of a line. First welding line 51, intermediate welding line 53 and second welding line 52 continuously extend in a manner of a line between first inner circumferential portion 62A of first welding line 51 and second inner circumferential portion 62B of second welding line 52. First welding line 51, intermediate welding line 53 and second welding line 52 are formed by a continuous line that can be drawn with one stroke.

As described above, in the present embodiment, first welding line 51, intermediate welding line 53 and second welding line 52 continuously extend in a manner of a line, and thus, a laser beam can be scanned without interruption during laser welding of back frame 20 and recliner 40. As a result, the work efficiency during laser welding can be increased.

In addition, first circumferential end portion 63A is provided on the end side of first through hole 28A opposite to intermediate welding line 53 in the circumferential direction of central axis 101, and second circumferential end portion 63B is provided on the end side of second through hole 28B opposite to intermediate welding line 53 in the circumferential direction of central axis 101. With such a configuration, when an excessive moment is input to recliner 40 about central axis 101, the occurrence of stress concentration on the opposing ends of joint portion 50 in the circumferential direction of central axis 101 can be prevented.

In addition, as a radial distance from central axis 101 becomes longer, the moment input to recliner 40 about central axis 101 is more likely to cause welding separation. In order to deal with this, in the present embodiment, intermediate welding line 53 connects first outer circumferential portion 61A and second outer circumferential portion 61B. As a result, there is no termination of the welding line in first outer circumferential portion 61A and second outer circumferential portion 61B having a long radial distance from central axis 101, and thus, welding separation in joint portion 50 can be prevented more effectively.

The structure of seat 10 for a vehicle according to the embodiment of the present disclosure described above will be summarized. Seat 10 for a vehicle according to the present embodiment includes: seat frame 15 having back frame 20; and recliner 40 configured to allow back frame 20 to pivot about central axis 101 serving as a prescribed pivot axis with respect to the cushion frame. Seat frame 15 (side frame 21 of back frame 20) serving as one of seat frame 15 and recliner 40 is provided with through hole 28 arranged around central axis 101. Recliner 40 serving as the other of seat frame 15 and recliner 40 has protruding portion 44 protruding in the axial direction of central axis 101 and fitted into through hole 28. Seat 10 for a vehicle further includes joint portion 50 formed by joining seat frame 15 (side frame 21 of back frame 20) and recliner 40 using laser welding. Joint portion 50 has outer circumferential portion 61, inner circumferential portion 62 and circumferential end portion 63. Outer circumferential portion 61 extends along the edge on the outer circumferential side of through hole 28 when viewed from central axis 101. Inner circumferential portion 62 extends along the edge on the inner circumferential side of through hole 28 when viewed from central axis 101. Circumferential end portion 63 extends along the edge on the end side of through hole 28 in the circumferential direction of central axis 101 and connects outer circumferential portion 61 and inner circumferential portion 62.

According to seat 10 for a vehicle in the embodiment of the present disclosure configured as described above, it is possible to sufficiently increase the resistance of joining between back frame 20 and recliner 40 to an external shock, while suppressing an increase in seat weight.

In the present embodiment, description has been given of the case in which the welded structure of the joint portion having the outer circumferential portion, the inner circumferential portion and the circumferential end portion in the present disclosure is applied to joining between back frame 20 and recliner 40. However, the present disclosure is not limited thereto, and may be applied to, for example, joining between the reclining plate on the cushion frame side and the recliner.

The present disclosure will be summarized below.

A seat for a vehicle according to the present disclosure includes: a seat frame having a back frame and a cushion frame; and a recliner configured to allow the back frame to pivot about a prescribed pivot axis with respect to the cushion frame. One of the seat frame and the recliner is provided with a through hole arranged around the pivot axis. The other of the seat frame and the recliner has a protruding portion protruding in an axial direction of the pivot axis and fitted into the through hole. The seat for a vehicle further includes a joint portion formed by joining the seat frame and the recliner using laser welding. The joint portion has an outer circumferential portion, an inner circumferential portion and a circumferential end portion. The outer circumferential portion extends along an edge on an outer circumferential side of the through hole when viewed from the pivot axis. The inner circumferential portion extends along an edge on an inner circumferential side of the through hole when viewed from the pivot axis. The circumferential end portion extends along an edge on an end side of the through hole in a circumferential direction of the pivot axis and connects the outer circumferential portion and the inner circumferential portion.

According to the seat for a vehicle configured as described above, the joint portion has the circumferential end portion. Therefore, even when an excessive moment is input to the recliner about the pivot axis, the occurrence of stress concentration on the joint portion can be prevented. As a result, the resistance of joining between the seat frame and the recliner to an external shock can be sufficiently increased. Since laser welding is used to join the seat frame and the recliner, an increase in seat weight can be suppressed although the joint portion has the outer circumferential portion, the inner circumferential portion and the circumferential end portion.

Preferably, as the through hole, one of the seat frame and the recliner is provided with a first through hole and a second through hole spaced apart from each other in the circumferential direction of the pivot axis. As the protruding portion, the other of the seat frame and the recliner has a first protruding portion fitted into the first through hole, and a second protruding portion fitted into the second through hole. The joint portion includes: a first welding line; a second welding line; and an intermediate welding line. The first welding line has, as the outer circumferential portion, the inner circumferential portion and the circumferential end portion, a first outer circumferential portion, a first inner circumferential portion and a first circumferential end portion extending along an edge of the first through hole. The second welding line has, as the outer circumferential portion, the inner circumferential portion and the circumferential end portion, a second outer circumferential portion, a second inner circumferential portion and a second circumferential end portion extending along an edge of the second through hole. The intermediate welding line connects the first welding line and the second welding line. The first welding line, the intermediate welding line and the second welding line continuously extend in a manner of a line.

According to the seat for a vehicle configured as described above, the first welding line, the intermediate welding line and the second welding line continuously extend in a manner of a line, and thus, the work efficiency during laser welding can be increased.

Preferably, the first circumferential end portion is provided on an end side of the first through hole opposite to the intermediate welding line in the circumferential direction of the pivot axis. The second circumferential end portion is provided on an end side of the second through hole opposite to the intermediate welding line in the circumferential direction of the pivot axis.

According to the seat for a vehicle configured as described above, when an excessive moment is input to the recliner about the pivot axis, the occurrence of stress concentration on the opposing ends of the joint portion in the circumferential direction of the pivot axis in which the first through hole and the second through hole are aligned can be prevented.

Preferably, the intermediate welding line connects the first outer circumferential portion and the second outer circumferential portion.

According to the seat for a vehicle configured as described above, there is no termination of the welding line in the first outer circumferential portion and the second outer circumferential portion on which a moment input to the recliner about the pivot axis acts more strongly. Therefore, the resistance of joining between the back frame and the recliner to an external shock can be further increased.

Preferably, the circumferential end portion extends to be curved between the outer circumferential portion and the inner circumferential portion.

According to the seat for a vehicle configured as described above, when an excessive moment is input to the recliner about the pivot axis, the occurrence of stress concentration on the joint portion can be prevented more effectively.

As described above, according to the present disclosure, there can be provided a seat for a vehicle allowing for a sufficient increase in resistance of joining between a seat frame and a recliner to an external shock, while suppressing an increase in seat weight.

The present disclosure is applied to a seat for a vehicle such as an automobile, an airplane, a ship, and a train.

While the embodiment of the present disclosure has been described, it should be understood that the embodiment disclosed herein is illustrative and non-restrictive in every respect. The scope of the present disclosure is defined by the terms of the claims and is intended to include any modifications within the scope and meaning equivalent to the terms of the claims.

What is claimed is:

1. A seat for a vehicle, comprising:
a seat frame having a back frame and a cushion frame;
a recliner configured to allow the back frame to pivot about a prescribed pivot axis with respect to the cushion frame,
one of the seat frame and the recliner being provided with a through hole arranged around the pivot axis,
the other of the seat frame and the recliner having a protruding portion protruding in an axial direction of the pivot axis and fitted into the through hole; and
a joint portion formed by joining the seat frame and the recliner using laser welding, the joint portion having an outer circumferential portion, an inner circumferential portion and a circumferential end portion, the outer circumferential portion extending along an edge on an outer circumferential side of the through hole when viewed from the pivot axis, the inner circumferential portion extending along an edge on an inner circumferential side of the through hole when viewed from the pivot axis, the circumferential end portion extending along an edge on an end side of the through hole in a circumferential direction of the pivot axis and connecting the outer circumferential portion and the inner circumferential portion,
wherein the circumferential end portion extends to be curved between the outer circumferential portion and the inner circumferential portion.

2. The seat for a vehicle according to claim 1, wherein
as the through hole, one of the seat frame and the recliner is provided with a first through hole and a second through hole spaced apart from each other in the circumferential direction of the pivot axis,
as the protruding portion, the other of the seat frame and the recliner has a first protruding portion fitted into the first through hole, and a second protruding portion fitted into the second through hole,
the joint portion includes:
a first welding line having, as the outer circumferential portion, the inner circumferential portion and the circumferential end portion, a first outer circumferential portion, a first inner circumferential portion and a first circumferential end portion extending along an edge of the first through hole;
a second welding line having, as the outer circumferential portion, the inner circumferential portion and the circumferential end portion, a second outer circumferential portion, a second inner circumferential portion and a second circumferential end portion extending along an edge of the second through hole; and
an intermediate welding line connecting the first welding line and the second welding line, and
the first welding line, the intermediate welding line and the second welding line continuously extend in a manner of a line.

3. The seat for a vehicle according to claim 2, wherein
the first circumferential end portion is provided on an end side of the first through hole opposite to the intermediate welding line in the circumferential direction of the pivot axis, and
the second circumferential end portion is provided on an end side of the second through hole opposite to the intermediate welding line in the circumferential direction of the pivot axis.

4. The seat for a vehicle according to claim 2, wherein
the intermediate welding line connects the first outer circumferential portion and the second outer circumferential portion.

* * * * *